US006883656B2

(12) United States Patent
Schmidt et al.

(10) Patent No.: US 6,883,656 B2
(45) Date of Patent: Apr. 26, 2005

(54) DRIVER UNIT FOR MULTI-DISK CLUTCH SYSTEMS

(75) Inventors: Thomas Schmidt, Bertwartsteinstr (DE); Frank Guenter, Egerlandstr (DE); Robert Weiss, Sehaelzigweg (DE)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/619,234

(22) Filed: Jul. 14, 2003

(65) Prior Publication Data

US 2004/0060795 A1 Apr. 1, 2004

(30) Foreign Application Priority Data

Jul. 16, 2002 (EP) .............................. 02015850

(51) Int. Cl.⁷ .............................................. F16D 13/68
(52) U.S. Cl. ................... 192/70.2; 192/107 R
(58) Field of Search ............................ 192/70.2, 107 R; 403/359.2, 359.6

(56) References Cited

U.S. PATENT DOCUMENTS

| 1,467,732 | A |   | 9/1923  | Litle, Jr. ...................... 192/207 |
| 1,518,604 | A |   | 12/1924 | Rosner ........................ 192/70.2 |
| 3,069,929 | A |   | 12/1962 | Hansen ......................... 74/785 |
| 3,245,508 | A |   | 4/1966  | Livezey .................... 192/70.17 |
| 3,803,872 | A |   | 4/1974  | Wolf ............................. 64/9 R |
| 4,225,026 | A | * | 9/1980  | Yamamori et al. .......... 192/70.2 |
| 4,989,708 | A | * | 2/1991  | Gaggermeier .............. 192/70.2 |
| 5,642,958 | A | * | 7/1997  | Sugiyama ................ 403/359.6 |
| 5,979,627 | A |   | 11/1999 | Ruth et al. ................ 192/70.17 |
| 6,044,948 | A | * | 4/2000  | Okada et al. ............... 192/70.2 |
| 6,210,280 | B1|   | 4/2001  | Nagano et al. ................ 464/68 |
| 6,397,997 | B1|   | 6/2002  | Kato ........................ 192/70.14 |
| 2004/0134740 | A1 | * | 7/2004 | Gerathewohl et al. ..... 192/70.2 |

FOREIGN PATENT DOCUMENTS

| FR | 732 196 A   | 9/1932  |
| FR | 924 404 A   | 8/1947  |
| GB | 2 275 318 A | 8/1994  |
| JP | 5-272549 A  | 10/1993 |

* cited by examiner

Primary Examiner—Richard M. Lorence
(74) Attorney, Agent, or Firm—Bliss McGlynn, P.C.; Greg Dziegielewski

(57) ABSTRACT

A driver unit for multi-disk clutch systems includes a driver disk having a plurality of external teeth and a clutch hub into which the driver disk is adapted to be inserted. The clutch hub also includes a casing and a plurality of internal teeth disposed on the casing and adapted to be cooperatively received in meshing engagement with the external teeth.

13 Claims, 3 Drawing Sheets

DRIVER UNIT FOR MULTI-DISK CLUTCH SYSTEMS

BACKGROUND OF THE INVENTION

1. Field of the Invention

The present invention relates, generally, to multi-disk clutch systems and, particularly, to a driver unit for use in such systems.

2. Description of the Related Art

It is known to use a driver unit to drive multi-disk clutch systems in double clutches. The known driver unit is rotatable and typically includes a driver disk and a clutch hub. The driver disk includes a plurality of external teeth disposed in the circumferential direction of the driver disk. The clutch hub includes a plurality of internal teeth. The external teeth are adapted to be force-fittingly inserted into the internal teeth for assembly of the driver unit.

When the driver unit is assembled, the driver disk and the clutch hub have a common axis of rotation. In operation, as speeds of the driver unit increase, the clutch hub substantially expands radially in relation to the driver disk. As a result, during high speeds of the driver unit, backlash between the internal and external teeth increases. Consequently, disturbing rattling noises occur, especially when the initiated torque is subject to strong oscillations.

Thus, there is a need for a driver unit that reduces such noises, especially when the initiated torque is subject to strong oscillations. Particularly, there is a need for a driver unit that does not increase backlash between the internal and external teeth during high speeds of the driver unit. More particularly, there is a need for a driver unit the clutch hub of which does not substantially expand radially in relation to the driver disk of the driver unit as speeds of the driver unit increase.

SUMMARY OF THE INVENTION

The present invention overcomes the disadvantages in the related art in a driver unit for multi-disk clutch systems including a driver disk having a plurality of external teeth and a clutch hub into which the driver disk is adapted to be inserted. The clutch hub also has a casing and a plurality of internal teeth disposed on the casing and adapted to be cooperatively received in meshing engagement with the external teeth.

One advantage of the driver unit for multi-disk clutch systems of the present invention is that it reduces disturbing rattling or humming noises at low or high speeds of the driver unit, especially when the initiated torque is subject to strong oscillations.

Another advantage of the driver unit of the present invention is that it produces a force-fit between the internal and external teeth free of backlash at high or low speeds of the driver unit.

Another advantage of the driver unit of the present invention is that expansion and deformation of the clutch hub is reduced.

Another advantage of the driver unit of the present invention is that the clutch hub can be manufactured easily and, thus, economically.

Another advantage of the driver unit of the present invention is that the driver disk and clutch hub can be easily assembled to each other.

Another advantage of the driver unit of the present invention is that the clutch hub has greater springiness.

Other objects, features, and advantages of the present invention will be readily appreciated as the same becomes better understood while reading the subsequent description taken in conjunction with the accompanying drawings.

DETAILED DESCRIPTION OF THE INVENTION

Figure 1:
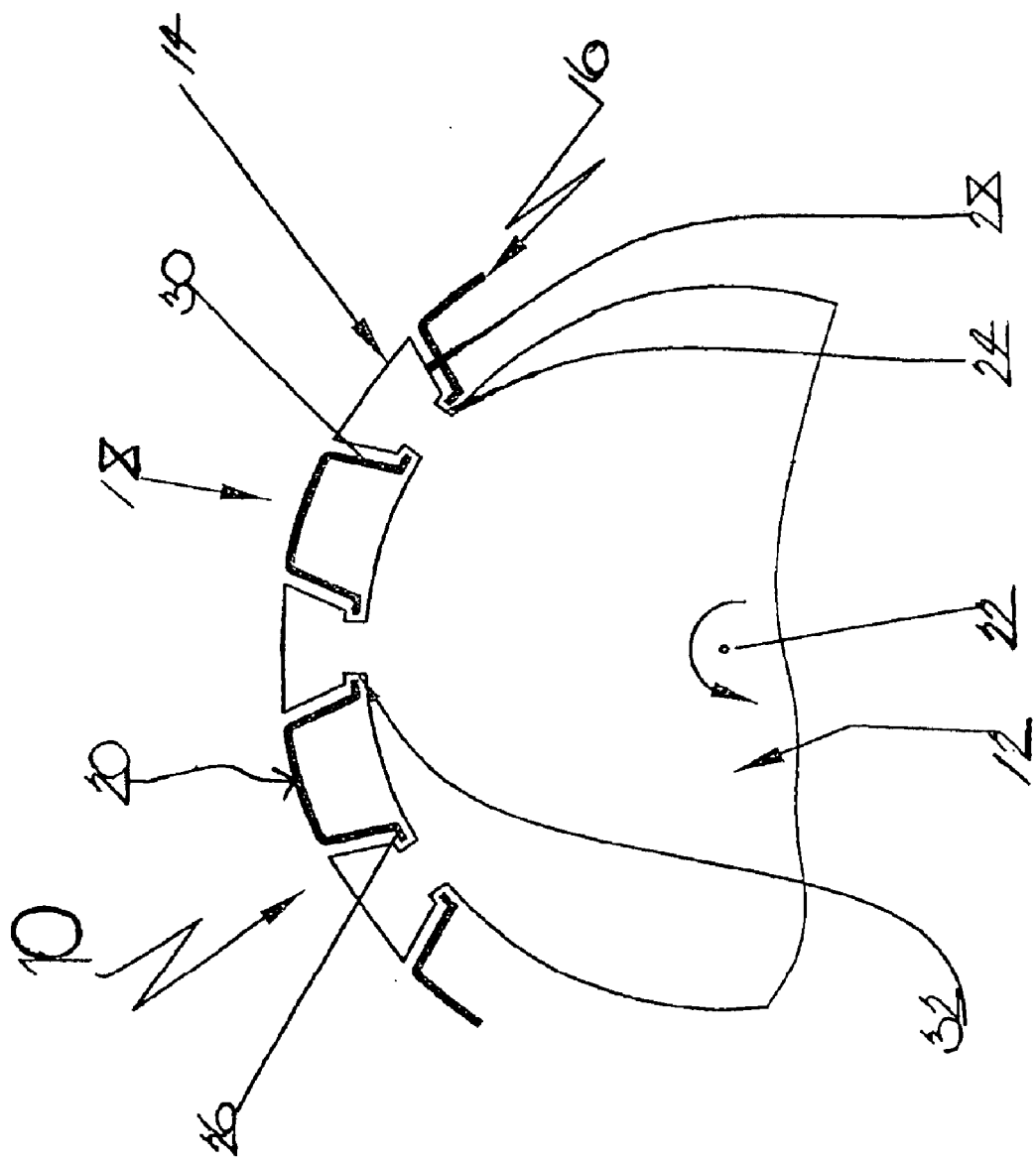
FIG. 1 is a plan view of a section of a first embodiment of a driver unit for multi-disk clutch systems of the present invention.

Referring now to the figures, a first embodiment of a driver unit for multi-disk clutch systems of the present invention is generally indicated at 10 in FIG. 1. In general, the driver unit 10 includes a driver disk, generally indicated at 12, having a plurality of external teeth, generally indicated at 14, and a clutch hub, generally indicated at 16, into which the driver disk 12 is adapted to be inserted. The clutch hub 16 also has a casing, generally indicated at 18, and a plurality of internal teeth, generally indicated at 20, disposed on the casing 18 and adapted to be cooperatively received in meshing engagement with the external teeth 14.

More specifically, the driver unit 10 is rotatable, and the clutch hub 16 and the driver disk 12 are substantially rotationally symmetrical. The clutch hub 16 is substantially cylindrical. The internal teeth 20 are spaced substantially uniformly from one another and extend axially from an end of the casing 18. Preferably, the casing 18 is a profile component with respect to the internal teeth 20. The external teeth 14 are spaced substantially uniformly from one another and disposed radially from the circumference of the driver disk 12.

The internal teeth 20 are cooperatively received in meshing engagement with the external teeth 14 such that the external teeth 14 are disposed at substantially right angles to the internal teeth 20. Preferably, the internal teeth 20 are cooperatively received in meshing engagement with the external teeth 14 in the radial, tangential, and/or circumferential direction(s). More preferably, the external teeth 14 are cooperatively received in meshing engagement with the internal teeth 20 elastically under initial stress in the radial and/or circumferential direction(s) of the clutch hub 16 to the driver disk 12. This reduces rattling or humming noises at low speeds when the influence of centrifugal force is negligibly small and, therefore, does not have an effect.

To assemble the driver unit 10, the driver disk 12 is cooperatively received in meshing engagement with the clutch hub 16. In particular, the outer surface area of the casing 18 is cooperatively received in meshing engagement with the external teeth 14. When the driver unit 10 is assembled, the clutch hub 16 and the driver disk 12 have a common axis of rotation 22.

To elaborate, the casing 18 defines at least one recess 24 disposed between adjacent internal teeth 20 and extending axially to an end of the clutch hub 16. As a result, the driver disk 12 and the clutch hub 16 can be easily assembled, and the clutch hub 16 has greater springiness. Each recess 24 is engaged by an external tooth 14. Each recess 24 also defines a segment 26 that extends outwardly from the base of each side of the respective internal tooth 20.

Furthermore, both flanks 28 of at least one, preferably each, external tooth 14 taper in the radial direction such that the external tooth 14 tapers toward the axis of rotation 22. In contrast, both flanks 30 of at least one, preferably each, internal tooth 20 taper in the radial direction such that the internal tooth 20 tapers away from the axis of rotation 22. It is preferred that each flank 28 forms a diagonal gliding surface with respect to the corresponding flank 30 in the radial direction of the driver disk 12 and the clutch hub 16. Such a surface causes the driver unit 10 to have a fit between the external teeth 14 and the internal teeth 20 substantially free of backlash at high or low speeds. In addition, the base of at least one, preferably each, flank 28 defines an indentation 32 with which a corresponding segment 26 is engaged.

In this way, it is possible, for example, to produce a connection of the driver disk 12 and the clutch hub 16 free of backlash at low and high speeds. Thus, it is possible, for example, that the freedom from play at low speeds is caused by the initial stress from the diagonal gliding surfaces and at high speeds is caused by the meshing engagement of the external teeth 14 and the internal teeth 20 in the areas of the indentations 32 and the segments 26.

The driver disk 12 is designed as a sheet-metal deep drawing. The clutch hub 16 is manufactured by a sheet-metal-forming process, such as deep drawing.

Unlike as with the known driver units, radial expansion of the clutch hub 16 in relation to the driver disk 12 upon rotation of the driver unit 10 at high speeds about the axis of rotation 22 is prevented. Because the segments 26 engage the respective indentations 32 and the flanks 28 taper in an opposite direction as do the flanks 30, a radial shift of the flanks 30 substantially outwardly is prevented. Accordingly, radial expansion of the clutch hub 16 does not occur.

Figure 2:
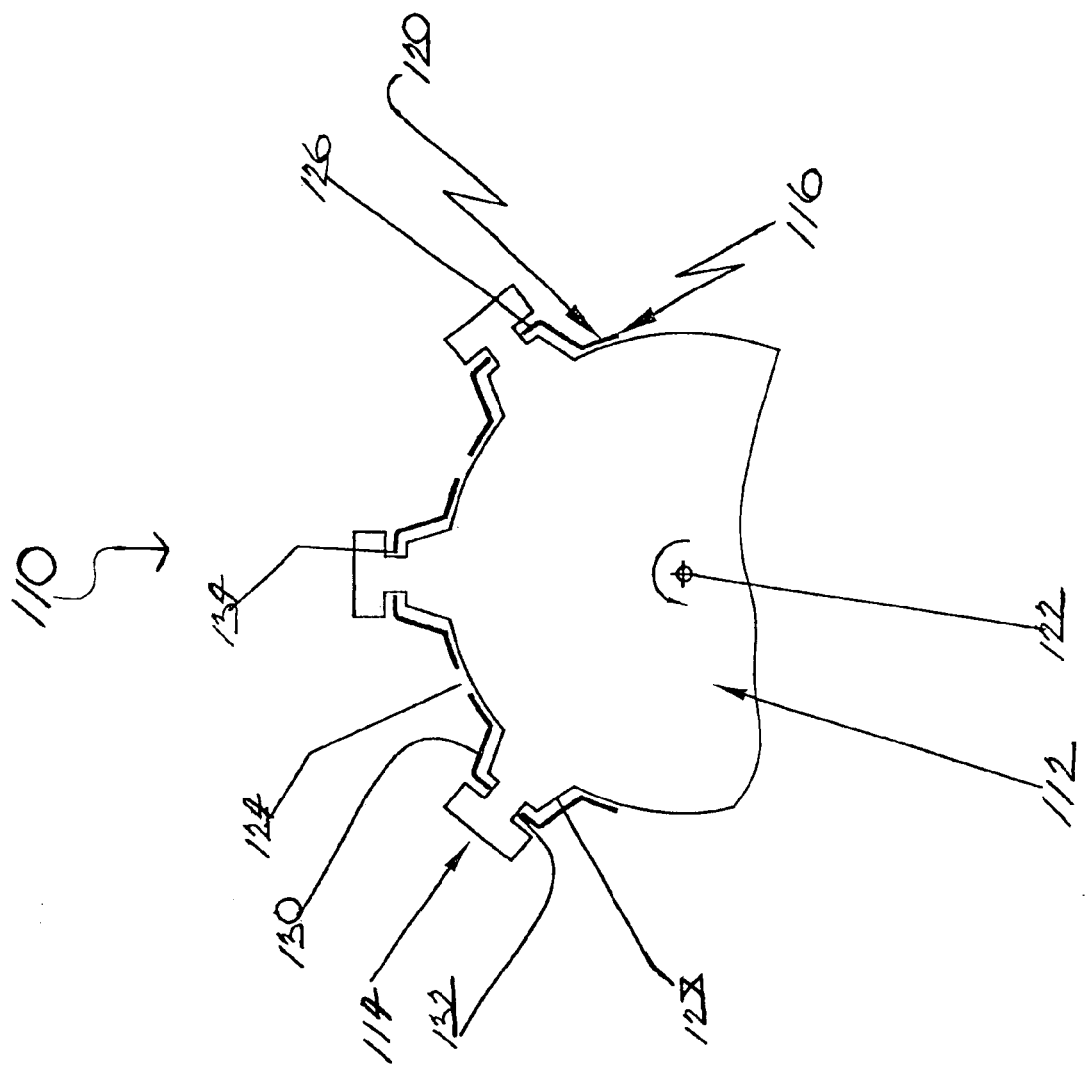
FIG. 2 is a plan view of a section of a second embodiment of a driver unit for multi-disk clutch systems of the present invention.
Figure 3:
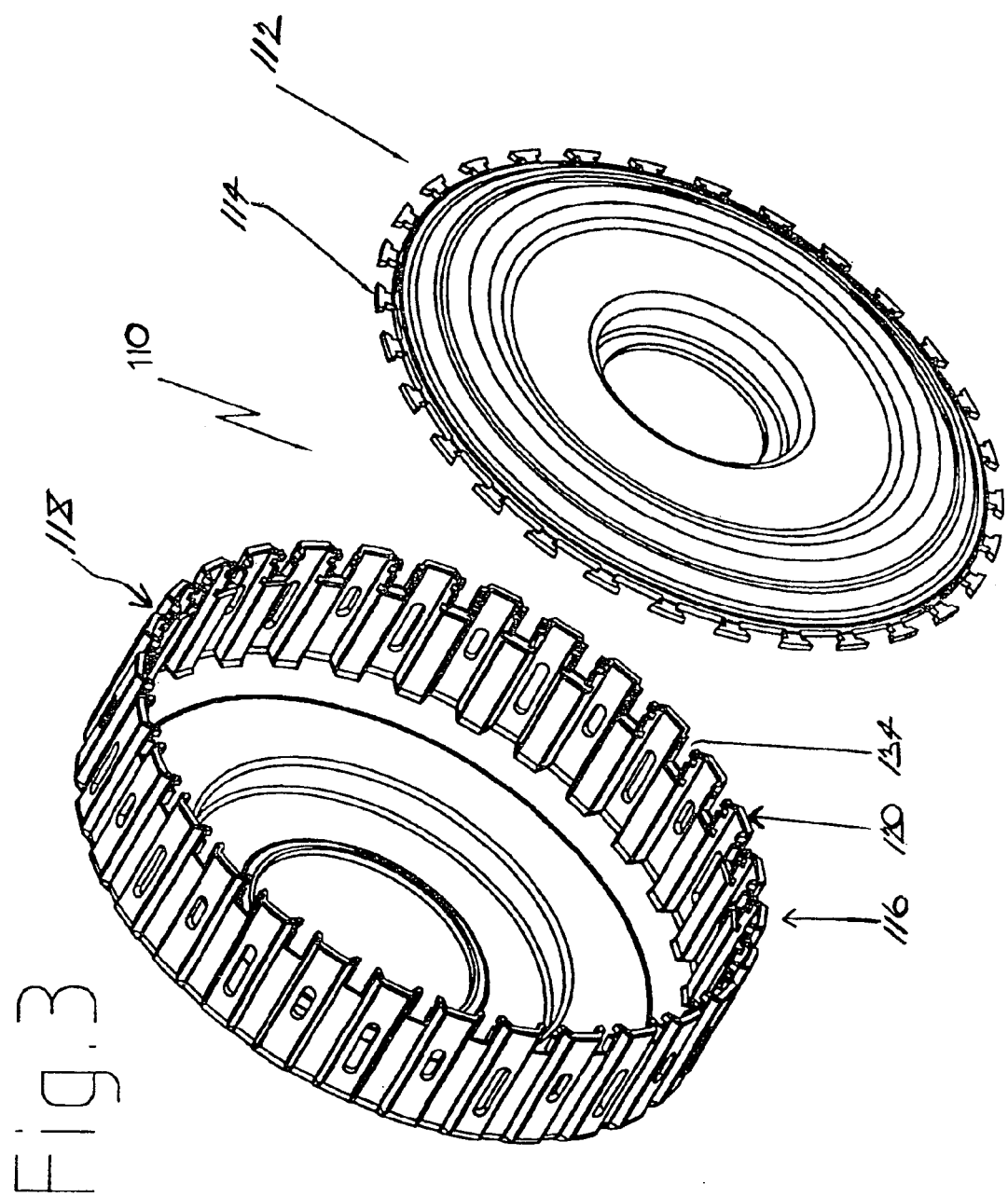
FIG. 3 is a perspective view of the second embodiment of a driver unit for multi-disk clutch systems of the present invention showing a driver disk and a clutch hub of the driver unit disengaged from each other.

Referring now to FIGS. 2 and 3, where like numerals increased by 100 are used to designate structure like that of FIG. 1, a second embodiment of a driver unit for multi-disk clutch systems of the present invention is generally indicated at 110. In general, the driver unit 110 includes a driver disk, generally indicated at 112, having a plurality of external teeth, generally indicated at 114, and a clutch hub, generally indicated at 116, into which the driver disk 112 is adapted to be inserted. The clutch hub 116 also has a casing, generally indicated at 118 in FIG. 3, and a plurality of internal teeth, generally indicated at 120, disposed on the casing 118 and adapted to be cooperatively received in meshing engagement with the external teeth 114.

More specifically, the driver unit 110 is rotatable, and the clutch hub 116 and the driver disk 112 are substantially rotationally symmetrical. The clutch hub 116 is substantially cylindrical. The internal teeth 120 are spaced substantially uniformly from one another and extend axially from an end of the casing 118. Preferably, the casing 118 is a profile component with respect to the internal teeth 120. The external teeth 114 are spaced substantially uniformly from one another and disposed radially from the circumference of the driver disk 112.

The internal teeth 120 are cooperatively received in meshing engagement with the external teeth 114 such that the external teeth 114 are disposed at substantially right angles to the internal teeth 120. Preferably, the internal teeth 120 are cooperatively received in meshing engagement with the external teeth 114 in the radial, tangential, and/or circumferential direction(s). More preferably, the external teeth 114 are cooperatively received in meshing engagement with the internal teeth 120 elastically under initial stress in the radial and/or circumferential direction(s) of the clutch hub 116 to the driver disk 112. This reduces rattling or humming noises at low speeds when the influence of centrifugal force is negligibly small and, therefore, does not have an effect.

To assemble the driver unit 110, the driver disk 112 is cooperatively received in meshing engagement with the clutch hub 116. In particular, the outer surface area of the casing 118 is cooperatively received in meshing engagement with the external teeth 114. When the driver unit 110 is assembled, the clutch hub 116 and the driver disk 112 have a common axis of rotation 122.

To elaborate, the casing 118 defines at least one recess 124 disposed between adjacent internal teeth 120 and extending axially to an end of the clutch hub 116. As a result, the driver disk 112 and the clutch hub 116 can be easily assembled, and the clutch hub 116 has greater springiness. The recesses 124 cause the clutch hub 116 to be elastically pre-stressed or deformable in relation to the driver disk 112. Also, the casing 118 defines at least one recess 134 disposed through each internal tooth 120 and extending axially to an end of the clutch hub 116. Each recess 134 is engaged by an external tooth 114 such that the external tooth 114 is over-dimensioned in the circumferential direction in relation to the internal tooth 120. Each recess 134 also defines a segment 126 on each side of the respective internal tooth 120.

Furthermore, both flanks 128 of at least one, preferably each, external tooth 114 taper in the radial direction such that the external tooth 114 tapers away from the axis of rotation 122. In the same way, both flanks 130 of at least one, preferably each, internal tooth 120 taper in the radial direction such that the internal tooth 120 tapers away from the axis of rotation 122. It is preferred that each flank 128 forms a diagonal gliding surface with respect to the corresponding flank 130 in the radial direction of the driver disk 112 and the clutch hub 116. Such a surface causes the driver unit 110 to have a fit between the external teeth 114 and the internal teeth 120 substantially free of backlash at high or low speeds. In addition, at least one, preferably each, flank 128 of each of the external teeth 114 defines an indentation 132 with which the corresponding segment 126 is engaged.

In this way, it is possible, for example, to produce a connection of the driver disk 112 and the clutch hub 116 free of backlash at low and high speeds. Thus, it is possible, for example, that the freedom from play at low speeds is caused by the initial stress from the diagonal gliding surface and at high speeds is caused by the meshing engagement of the external teeth 114 and the internal teeth 120 in the areas of the indentations 132 and the segments 126.

Upon rotation of the driver unit 110 at low speeds about the axis of rotation 122, the clutch hub 116 is substantially free from backlash and elastically pre-stressed relative to the driver disk 112 because of such flaring of the flanks 128 and over-dimensioning of the external teeth 114. Upon rotation of the driver unit 110 at high speeds about the axis of rotation 122, the segments 126 are pressed into the indentations 132 as a result of the effect of centrifugal force. A force-fit substantially free of backlash results between the external teeth 114 and the internal teeth 120.

Unequal radial expansion of the clutch hub 16, 116 and the driver disk 12, 112 under the influence of centrifugal force effects meshing engagement of the external teeth 14, 114 and the internal teeth 20, 120. Such engagement in the radial and/or tangential direction(s) presses the internal teeth 20, 120 against the external teeth 14, 114. As a result, a force-fit free of backlash is produced between the external teeth 14, 114 and the internal teeth 20, 120. This results in neutralization of the increase in play between the external teeth 14, 114 and the internal teeth 20, 120 under the influence of centrifugal force.

When the outer surface area of the casing 18, 118 is engaged with the external teeth 14, 114, under the influence of centrifugal force, a connection free of backlash between the external teeth 14, 114 and the internal teeth 20, 120 is produced. Also, expansion and deformation of the clutch hub 16, 116 is reduced since the outer surface area of the clutch hub 16, 116 is supported by the driver disk 12, 112 as a result of the meshing engagement of the external teeth 14, 114.

Since the driver unit 10, 110 reduces centrifugal-force tensions in the clutch hub 16, 116, it is possible to manufacture the clutch hub 16, 116 easily and, thus, economically, for example, with the help of a deep drawing or deformation process. As a result, the casing 18, 118 in the area of the internal teeth 20, 120 is designed as a profile component.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A driver unit for multi-disk clutch systems comprising:
    a driver disk including a plurality of external teeth; and
    a clutch hub into which said driver disk is adapted to be inserted, said clutch hub including a casing and a plurality of internal teeth disposed on said casing and adapted to be cooperatively received in meshing engagement with said plurality of external teeth elastically under initial stress.

2. A driver unit as set forth in claim 1, wherein an outer surface area of said casing is cooperatively received in meshing engagement with said plurality of external teeth.

3. A driver unit as set forth in claim 1, wherein said casing defines at least one recess disposed between adjacent ones of said plurality of internal teeth.

4. A driver unit as set forth in claim 3, wherein said at least one recess extends axially to an end of said clutch hub.

5. A driver unit as set forth in claim 3, wherein said at least one recess is adapted to be engaged by one of said plurality of external teeth.

6. A driver unit as set forth in claim 1, wherein said casing defines at least one recess disposed through each of said plurality of internal teeth.

7. A driver unit as set forth in claim 6, wherein said at least one recess extends axially to an end of said clutch hub.

8. A driver unit as set forth in claim 6, wherein said at least one recess is adapted to be engaged by one of said plurality of external teeth.

9. A driver unit as set forth in claim 1, wherein at least one flank of each of said plurality of external teeth forms a diagonal gliding surface with respect to a corresponding flank of one of said plurality of internal teeth in the radial direction.

10. A driver unit as set forth in claim 9, wherein both flanks of at least one of said plurality of external teeth taper in the radial direction.

11. A driver unit as set forth in claim 9, wherein both flanks of at least one of said plurality of internal teeth taper in the radial direction.

12. A driver unit as set forth in claim 3, wherein each recess defines a segment on each side of the respective one of said plurality of internal teeth and at least one flank of each of said plurality of external teeth defines an indentation with which said corresponding segment is engaged.

13. A driver unit as set forth in claim 6, wherein each recess defines a segment on each side of the respective one of said plurality of internal teeth and at least one flank of each of said plurality of external teeth defines an indentation with which said corresponding segment is engaged.

* * * * *